(12) United States Patent
Kray et al.

(10) Patent No.: US 8,905,719 B2
(45) Date of Patent: Dec. 9, 2014

(54) COMPOSITE ROTOR AND VANE ASSEMBLIES WITH INTEGRAL AIRFOILS

(75) Inventors: Nicholas Joseph Kray, Mason, OH (US); Christopher Lee McAfee, Fairfield, OH (US); Dong-Jin Shim, Cohoes, NY (US)

(73) Assignee: General Electric Co., Schenectady, NY (US)

( * ) Notice: Subject to any disclaimer, the term of this patent is extended or adjusted under 35 U.S.C. 154(b) by 538 days.

(21) Appl. No.: 13/331,418

(22) Filed: Dec. 20, 2011

(65) Prior Publication Data

US 2013/0156594 A1 Jun. 20, 2013

(51) Int. Cl.
*F01D 5/14* (2006.01)

(52) U.S. Cl.
USPC .......................................................... 416/230

(58) Field of Classification Search
USPC .............. 416/230, 241 A; 264/103, 258, 263, 264/273, 279.1
See application file for complete search history.

(56) References Cited

U.S. PATENT DOCUMENTS

| | | | | |
|---|---|---|---|---|
| 3,501,090 | A * | 3/1970 | Losee et al. | 416/189 |
| 3,758,232 | A * | 9/1973 | Wallett | 416/213 R |
| 4,098,559 | A * | 7/1978 | Price | 416/230 |
| 4,786,347 | A | 11/1988 | Angus | |
| 5,273,401 | A | 12/1993 | Griffin | |
| 5,284,420 | A * | 2/1994 | Guimbal | 416/134 A |
| 5,921,754 | A * | 7/1999 | Freitas et al. | 416/230 |
| 7,491,032 | B1 * | 2/2009 | Powell et al. | 416/230 |
| 8,011,877 | B2 | 9/2011 | Schilling et al. | |
| 8,636,466 | B2 * | 1/2014 | Cortequisse | 415/138 |
| 2004/0042902 | A1 | 3/2004 | Hornick et al. | |
| 2010/0126141 | A1 | 5/2010 | Schilling | |
| 2010/0163167 | A1 | 7/2010 | Maheshwari et al. | |

FOREIGN PATENT DOCUMENTS

| | | |
|---|---|---|
| EP | 0 710 728 A1 | 5/1996 |
| EP | 2196629 A1 | 6/2010 |
| EP | 2 302 171 A1 | 3/2011 |
| WO | 9808370 A2 | 3/1998 |

OTHER PUBLICATIONS

"New Approaches to Cost-effective Tooling", Composites World http://www.compositesworld.com, 5 pages, Oct. 10, 2011.
"Composite fabrication via the VARTM process", Prepared by Dr. Ronnie Bolick, North Carolina A&T State University.
"Material Qualification Methodology for 2X2 Biaxially Braided RTM Composite Material Systems", Advanced General Aviation Transport Experiments, AGATE-WP3.3-033048-116, Oct. 2001 J. Tomblin, W. Seneviratne, Y. Ng, Ric Abbott, Steve Stenard.
Search Report from PCT/2012/068368 dated Sep. 6, 2013.

* cited by examiner

*Primary Examiner* — Liam McDowell
(74) *Attorney, Agent, or Firm* — General Electric Co.; Steven J. Rosen (57) ABSTRACT

A composite gas turbine engine structure includes a retention ring with airfoils mounted on, integral with, and extending radially away from retention ring. Retention ring includes annular composite plies, a circumferentially segmented airfoil ring including airfoil ring segments disposed around one of outer and inner circumferences of retention ring. Airfoil ring segments include annular bases and radially extending clockwise and counter-clockwise airfoil segments at clockwise and counter-clockwise ends of annular base. Composite airfoils include circumferentially adjacent ones of the clockwise and counter-clockwise airfoil segments. A flowpath shell circumferentially disposed around segmented airfoil ring traps annular bases between flowpath shell and retention ring. Composite airfoils airfoils extend through slots in flowpath shell. Plies may be wrapped in a single spiral made from a continuous composite tape. Slots may be circumferentially angled. Circumferentially adjacent ones of clockwise and counter-clockwise airfoil segments may be stitched together.

25 Claims, 8 Drawing Sheets

COMPOSITE ROTOR AND VANE ASSEMBLIES WITH INTEGRAL AIRFOILS

BACKGROUND OF THE INVENTION

1. Field of the Invention

The invention relates to gas turbine engine rotors and vane assemblies and, particularly, to composite rotors and stators with integral airfoils for aircraft gas turbine engines.

2. Description of Related Art

Integrally bladed rotors (IBRs) or bladed disks often called (BLISKS) are known in the art for use in gas turbine engines. Turbofan gas turbine engines generally includes a forward fan and booster compressor, a middle core engine, and an aft low pressure power turbine. Blisks have been manufactured of metallic materials usually as single items machined from a solid metal billet or as several elements welded together. Metal BLISKS are relatively heavy. Metals have a lower specific strength and have very little inherent damping as compared to composite materials.

Composite integrally bladed rotors for use in gas turbine engines have been disclosed in several patents such as U.S. Pat. Nos. 4,747,900, 4,786,347, and 7,491,032. Composite integrally bladed rotors are subject to large forces which must be taken into account in designing the construction of the rotor to preserve its integrity. In the rotor disc, the major forces are exerted in circumferential directions so an ability to absorb hoop stress is important, whereas in the aerofoil blades radially exerted forces predominate. Composite material used in such rotors typically include a resin (such as epoxy) which has low inherent strength. The composite material has a specific strength higher than that of metal due to the inclusion of fibers normally of the same material embedded in a matrix of the composite material. The fibers are known to be strongest in tension so the direction of the forces in the finished component will, at least in part, determine its strength. In some instances, the structural design of the component has been influenced by the need for fiber orientation.

Composite matrix integrally bladed rotors, disks, vanes, and the methods for manufacturing them are very labor intensive, time-consuming, and very expensive. It is highly desirable to have a design and method for manufacturing composite matrix integrally bladed rotors, disks, and vanes that is far less labor intensive, time-consuming, and expensive. It is highly desirable to have a design and method for manufacturing composite matrix integrally bladed rotors, disks, and vanes that are strong, allows for a central bore and yet is relatively quick and easy to manufacture.

SUMMARY OF THE INVENTION

A composite gas turbine engine structure includes an annular composite retention ring circumscribed about a centerline axis and composite airfoils mounted on and integral with and extending radially away from the retention ring. The retention ring includes annular composite plies and a circumferentially segmented airfoil ring including airfoil ring segments disposed around one of an outer and inner circumferences of the retention ring. Each of airfoil ring segments includes an annular base and radially extending clockwise and counter-clockwise airfoil segments at clockwise and counter-clockwise ends of the annular base. Each of the composite airfoils includes circumferentially adjacent ones of the clockwise and counter-clockwise airfoil segments. A flowpath shell is circumferentially disposed around the segmented airfoil ring and traps the annular bases between the flowpath shell and the retention ring. The composite airfoils extend through inner airfoil slots in the flowpath shell. The slots may be circumferentially angled or canted in a clockwise direction or a counter-clockwise direction.

The annular composite plies may be wrapped in a single spiral made from a continuous composite tape. The retention ring, the composite airfoils, and the inner or outer flowpath shell may be made at least in part from a carbon fiber woven material.

The circumferentially adjacent ones of the clockwise and counter-clockwise airfoil segments may be stitched together.

Another embodiment of the composite gas turbine engine structure includes an annular retention ring radially spaced apart and inwardly of an annular composite shroud circumscribed about a centerline axis and composite airfoils integral with and extending radially between the retention ring and the shroud. The retention ring and the shroud include annular composite plies and a circumferentially segmented composite airfoil ring including airfoil ring segments disposed around an outer circumference of the retention ring. Each of airfoil ring segments includes an annular base and radially extending clockwise and counter-clockwise airfoil segments at clockwise and counter-clockwise ends of the annular base. Each of the composite airfoils includes circumferentially adjacent ones of the clockwise and counter-clockwise airfoil segments. An inner flowpath shell circumferentially disposed around the segmented airfoil ring traps the annular bases between the inner flowpath shell and the retention ring. The composite airfoils and the clockwise and counter-clockwise airfoil segments extend through inner slots in the inner flowpath shell.

An exemplary embodiment of the annular composite shroud includes an outer flowpath shell circumferentially disposed around and radially outwardly spaced apart from the outer flowpath shell. The clockwise and counter-clockwise airfoil segments extend radially outwardly through axially extending outer airfoil slots in the outer flowpath shell and clockwise and counter-clockwise shroud segments extend circumferentially counter-clockwise and clockwise from the clockwise and counter-clockwise airfoil segments respectively along and around the outer flowpath shell.

The annular composite plies may be wrapped in a single spiral in each of the retention ring and the annular composite shroud and the annular composite plies and the single spirals may be made from continuous composite tape. The retention ring, the annular composite shroud, and the composite airfoils may be made, at least in part, from a carbon fiber woven material. The circumferentially adjacent ones of the clockwise and counter-clockwise airfoil segments may be stitched together.

A method for making a composite gas turbine engine structure includes forming an integral preform having airfoil panels extend radially outwardly from and integral with a ring section, forming the ring section by wrapping a composite tape made of carbon fiber woven material, providing airfoil coupons made from the carbon fiber woven material and including a middle section and clockwise and counter-clockwise sections extending away from the middle section, positioning the airfoil coupons around the ring section with the middle sections on the ring section, positioning an inner sock made from the carbon fiber woven material radially outwardly of and covering the middle sections of the airfoil coupons with the clockwise and counter-clockwise sections extending through inner sock slots in the sock, positioning the clockwise and counter-clockwise sections to extend radially away from the middle sections to form the airfoil panels, and introducing resin into the preform and molding the preform and the resin to form the composite structure. Resin transfer molding or vacuum-assisted resin transfer molding may be used for the molding.

Circumferentially adjoining ones of the clockwise and counter-clockwise sections may be sewn or stitched together before the molding. The sock may be provided with the sock slots circumferentially angled or canted around the ring section.

Another method for making a gas turbine engine component composite structure includes forming a preform integrally with airfoil panels extending radially between inner and outer ring sections, forming the integral stator preform with carbon fiber woven material, forming the inner and outer ring sections by wrapping composite tape made of the carbon fiber woven material, providing airfoil coupons made from the carbon fiber woven material and including a middle section and clockwise and counter-clockwise sections extending away from the middle section, each of the clockwise and counter-clockwise sections including a panel section attached to the middle section and a shroud section attached to the panel section, positioning the airfoil coupons around the inner ring sections, providing inner and outer socks made from the carbon fiber woven material, positioning the inner sock radially outwardly of and covering the middle sections of the airfoil coupons with the clockwise and counter-clockwise sections extending through inner sock slots in the inner sock, positioning the clockwise and counter-clockwise sections to extend radially away from the middle sections to form the airfoil panels, drawing or passing the shroud sections through outer sock slots in the outer sock, positioning the shroud sections of the clockwise and counter-clockwise sections extending circumferentially away from the panel sections in the clockwise and counter-clockwise directions respectively around an inner circumferences or inner diameter of the outer ring section, and introducing resin into the preform and molding the preform and the resin to form the composite structure.

The middle sections of the airfoil coupons may be trapped between the inner sock and the inner ring section and the shroud sections of the clockwise and counter-clockwise sections of the airfoil coupons may be trapped between the outer sock and the outer ring section of the stator preform.

Circumferentially adjoining ones of the panel sections of the clockwise and counter-clockwise sections may be sewn or stitched together before the molding.

The inner and outer sock slots may be circumferentially angled or canted around the inner and outer ring sections.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
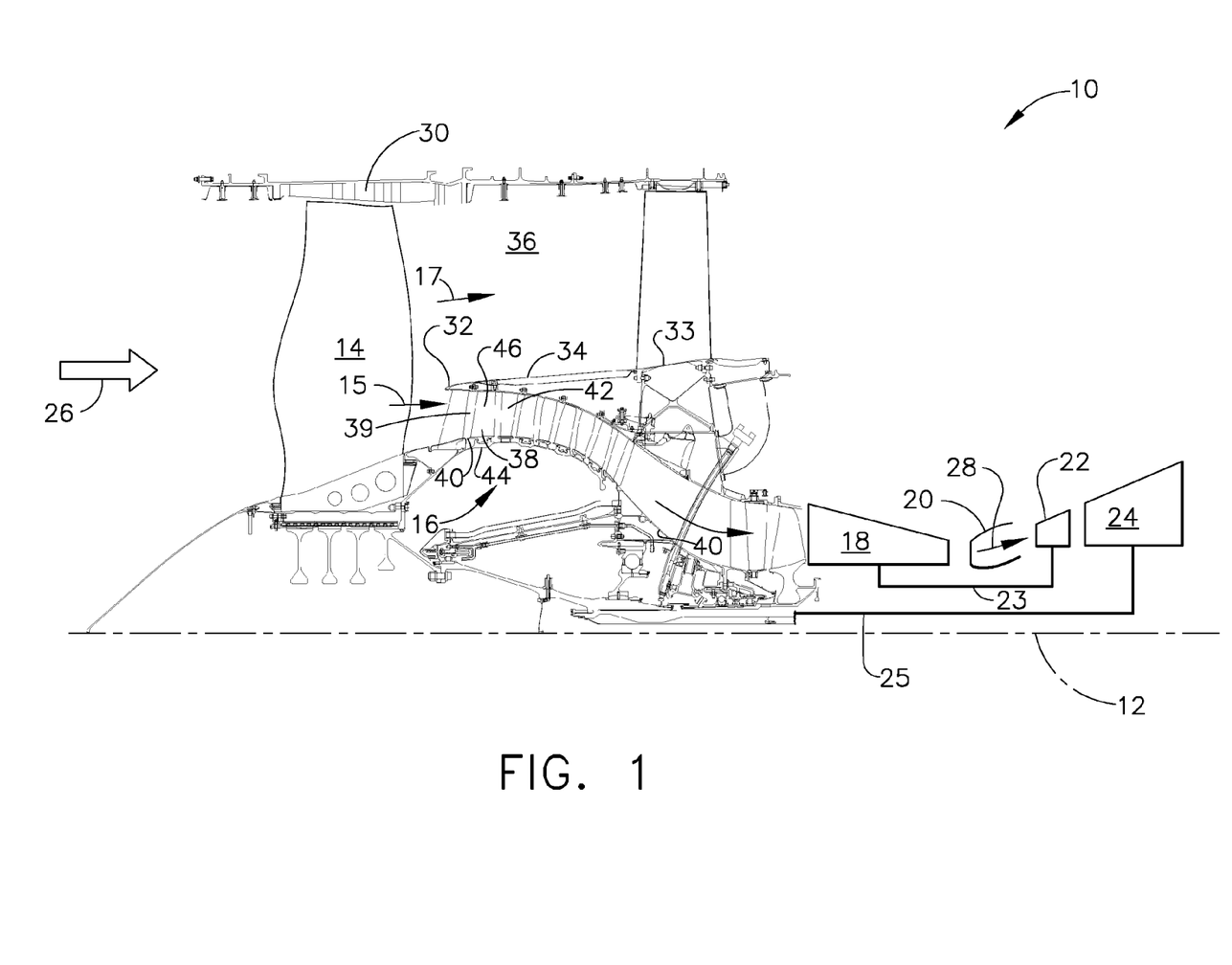
FIG. 1 is a longitudinal part sectional and part diagrammatical view illustration of an exemplary embodiment of an aircraft turbofan gas turbine engine with a composite integrally bladed rotor and a composite integral vane assembly.

Illustrated in FIG. 1 is an exemplary aircraft turbofan gas turbine engine 10 circumscribed about an engine centerline axis 12 and suitably designed to be mounted to a wing or fuselage of an aircraft. The engine 10 includes, in downstream serial flow communication, a fan 14, a booster 16, a high pressure compressor 18, a combustor 20, a high pressure turbine (HPT) 22, and a low pressure turbine (LPT) 24. The HPT or high pressure turbine 22 is joined by a high pressure drive shaft 23 to the high pressure compressor 18. The LPT or low pressure turbine 24 is joined by a low pressure drive shaft 25 to both the fan 14 and the booster 16.

In typical operation, air 26 is pressurized by the fan 14 and produces an inner air flow 15 channeled through the booster 16 which further pressurizes the inner air flow 15. The pressurized air is then flowed to the high pressure compressor 18 which further pressurizes the air. The pressurized air is mixed with fuel in the combustor 20 for generating hot combustion gases 28 that flow downstream in turn through the HPT 22 and the LPT 24.

A flow splitter 34 surrounding the booster 16 immediately behind the fan 14 includes a sharp leading edge 32 which splits the fan air 26 pressurized by the fan 14 into a radially inner stream (inner air flow 15) channeled through the booster 16 and a radially outer stream (bypass air flow 17) channeled through the bypass duct 36. A fan nacelle 30 surrounding the fan 14 is supported by an annular fan frame 33. The booster 16 includes alternating annular row of composite booster blades and vanes 38, 42 extending radially outwardly and inwardly across a booster flowpath 39 in a booster duct 40. The annular row of composite booster blades 38 are suitably joined to the fan 14. The booster 16 is located forward of the fan frame 33 and is disposed radially inboard of the flow splitter 34.

Figure 2:
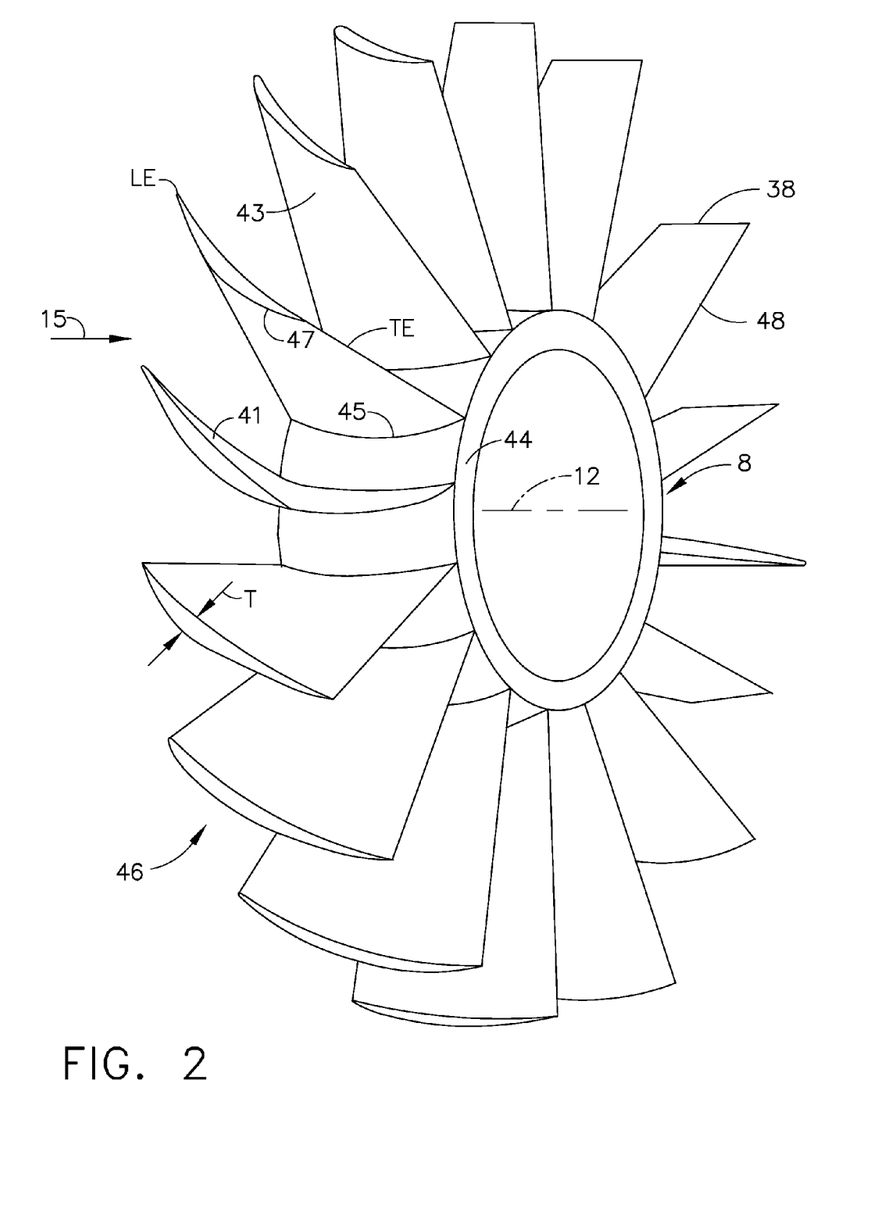
FIG. 2 is a perspective view illustration of the composite integrally bladed rotor in a booster of the engine illustrated in FIG. 1.

The composite booster blades 38 are integral with a composite rotor ring 44 in what is referred to as a composite integrally bladed rotor 46 (IBR) further illustrated in FIG. 2. The composite integrally bladed rotor 46 is an exemplary embodiment of a composite gas turbine engine structure 8 with integral composite airfoils 48 such as rotors and stators. Each of the booster blades 38 includes the composite airfoil 48 having pressure and suction sides 41, 43 extending outwardly from an airfoil base 45 at the composite rotor ring 44 to an airfoil tip 47. The exemplary pressure and suction sides 41, 43 illustrated herein are concave and convex respectively. The composite airfoils 48 include chordwise spaced apart leading and trailing edges LE, TE. The composite airfoils 48 are mounted on and are integral with the composite rotor ring 44.

Figure 3:
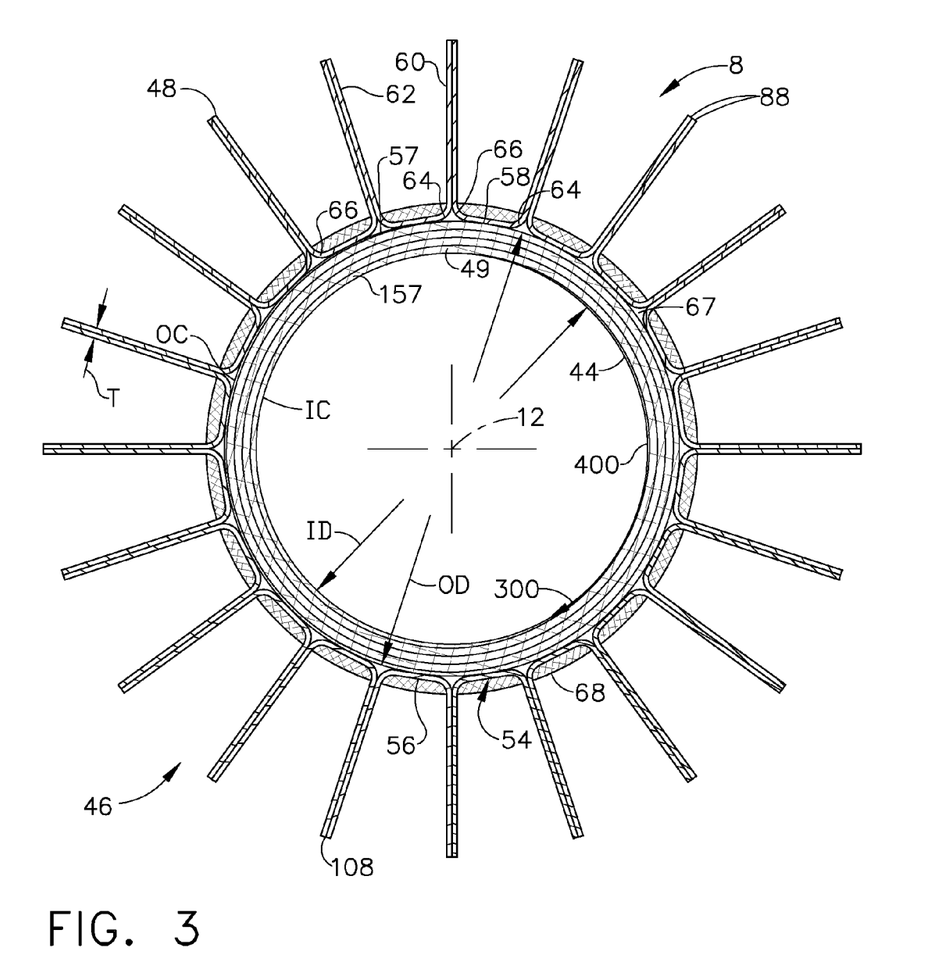
FIG. 3 is a cross-sectional view illustration of the composite integrally bladed rotor taken through 3-3 in FIG. 2.

A cross section of the composite integrally bladed rotor 46 is illustrated in FIG. 3. The composite rotor ring 44 includes annular composite layers or plies 49 which are made by wrapping a continuous composite tape 50, illustrated in FIG. 4, around a mandrel or tool (not shown). The composite tape 50 is, at least in part, made from a carbon fiber woven material and is continuously wound 360 degrees as many times as there are plies 49. Thus, the composite rotor ring 44 is a single continuous wrap or spiral 300 and the composite plies 49 are substantially circular or annular. The composite tape 50 is illustrated herein as being wound around 4 times which forms 4 substantially circular or annular composite plies 49 as illustrated in FIG. 3. Thus, the composite rotor ring 44 is substantially circular with outermost and innermost plies 57, 157 at outer and inner circumferences OC, IC or outer and inner diameters OD, ID respectively of the composite rotor ring 44.

Referring to FIG. 3, the composite integrally bladed rotor 46 further includes a circumferentially segmented airfoil ring 54 including airfoil ring segments 56 disposed around the outermost layer or ply 57 of the composite rotor ring 44. Each airfoil ring segment 56 includes an annular base 58 and radially extending clockwise and counter-clockwise airfoil segments 60, 62 at clockwise and counter-clockwise ends 64, 66 of the annular base 58. The annular base 58 is disposed about, substantially concentric with, and preferably upon the outermost ply 57 of the composite rotor ring 44. The airfoil ring 54, the annular bases 58, and the outermost ply 57 of the composite rotor ring 44 are circumscribed about the centerline axis 12 and may be conical or cylindrical. Circumferentially adjacent ones 88 of the clockwise and counter-clockwise airfoil segments 60, 62 are stitched together to form the integral airfoil panels 90.

The composite integrally bladed rotor 46 further includes an inner flowpath shell 68 circumferentially disposed around the segmented airfoil ring 54 and trapping the annular bases 58 between the inner flowpath shell 68 and the outermost ply 57 of the composite rotor ring 44. The clockwise and counter-clockwise airfoil segments 60, 62 extend radially outwardly through axially extending inner airfoil slots 67 in the inner flowpath shell 68. Note, that the slots are circumferentially angled or canted in a clockwise direction CW or a counter-clockwise direction CCW as indicated by slots in a preform 70 illustrated in FIG. 4 used to make the composite integrally bladed rotor 46. Each pair 69 of circumferentially adjacent clockwise and counter-clockwise airfoil segments 60, 62 form each one of the composite airfoils 48 illustrated in FIGS. 1-3.

Figure 4:
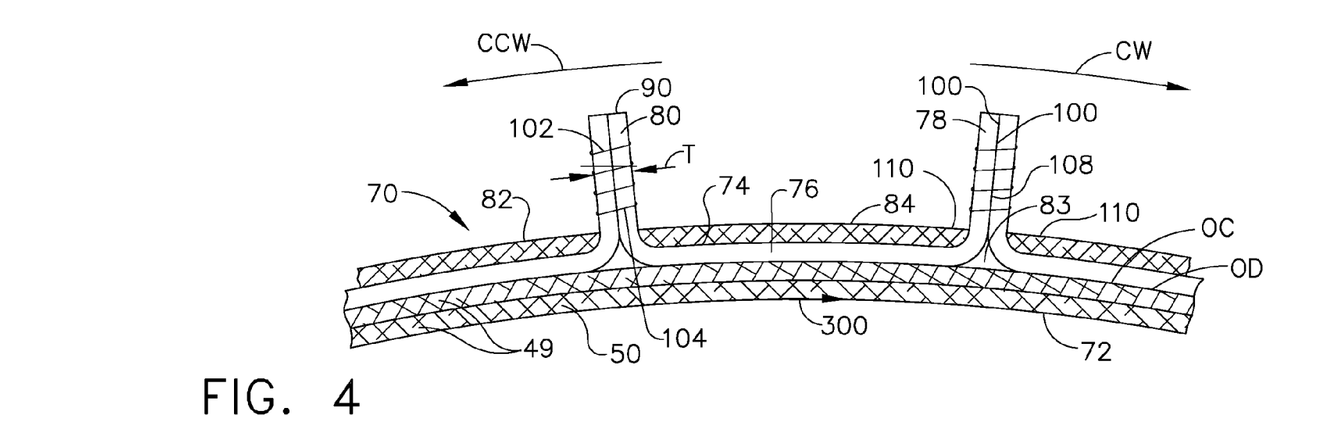
FIG. 4 is a cross-sectional view illustration of a portion of a preform used to manufacture the composite integrally bladed rotor illustrated in FIG. 3.

A composite rotor preform 70 illustrated in FIG. 4 is used to form and manufacture the composite integrally bladed rotor 46 illustrated in FIGS. 2 and 3. The annular composite plies 49 are made by wrapping the composite tape 50 around a mandrel or tool (not shown) to form a ring section 72 of the preform 70. The composite tape 50 is wrapped in a single spiral 300. Integral airfoil panels 90 extend radially outwardly from and are integrally formed with the ring section 72. Illustrated in FIGS. 4-8 are airfoil coupons 74 made from the same carbon fiber woven material used to form the ring segments 56. Each of the airfoil coupons 74 includes a middle section 76 and clockwise and counter-clockwise sections 78, 80 circumferentially extending away from the middle section 76 in the clockwise and counter-clockwise directions CW, CCW respectively. The middle sections 76 are placed around the outer circumferences OC or outer diameter OD of the ring section 72 of the preform 70.

Figure 5:
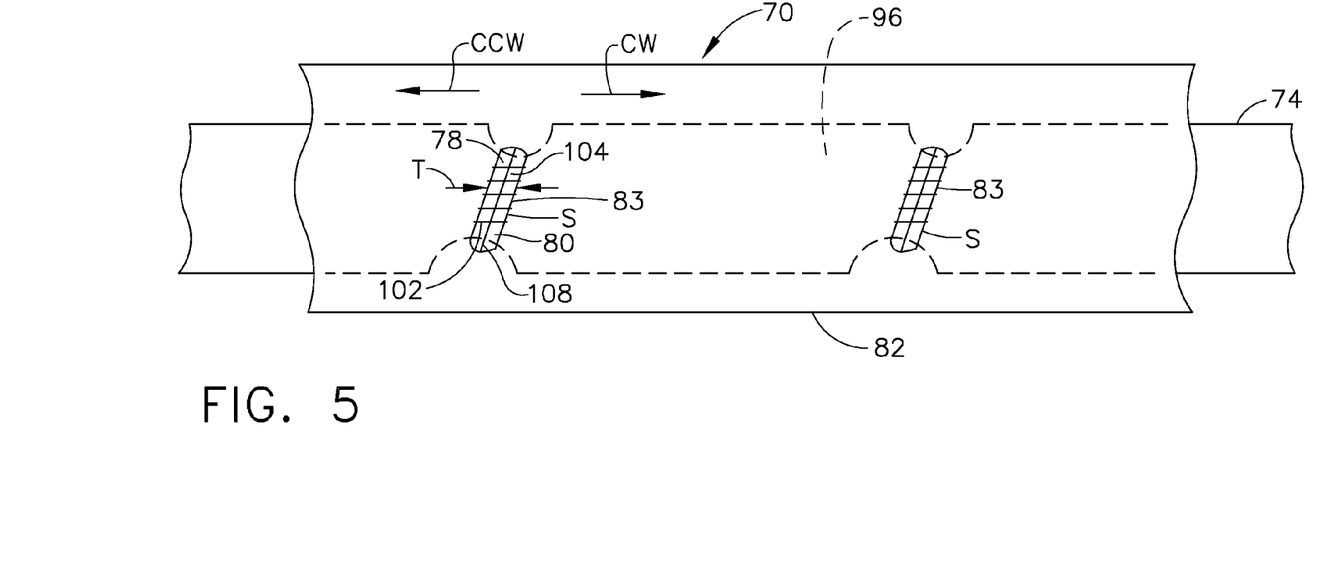
FIG. 5 is a radially inwardly looking layed out partially cut-away planform view illustration of the preform portion illustrated in FIG. 4.
Figure 9:
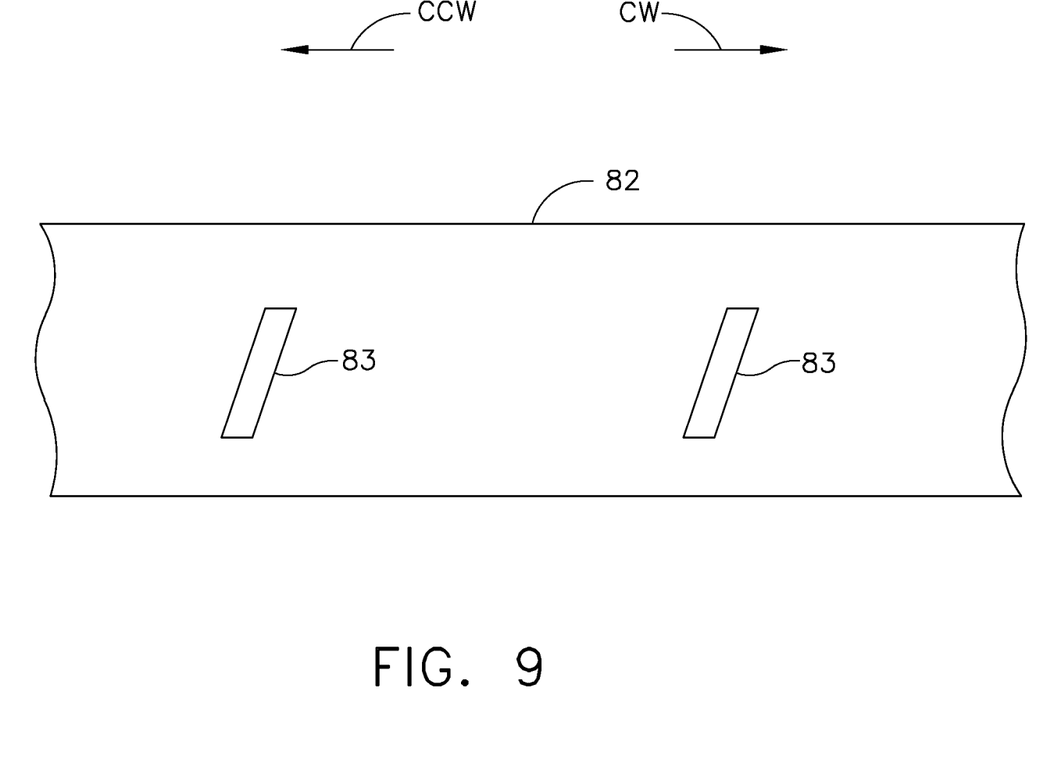
FIG. 9 is a planform view illustration of an over sock illustrated in FIG. 5.

Illustrated in FIGS. 4, 5, and 9 is an over sock 82 made from the carbon fiber woven material is used to form the inner flowpath shell 68. The sock 82 is positioned radially outwardly of and over the middle sections 76 of the airfoil coupons 74. The sock 82 traps, positions, and holds the middle sections 76 of the airfoil coupons 74 between the sock 82 and the ring section 72 of the preform 70. Axially extending sock slots 83 in the inner sock 84 are sized and positioned to correspond to and form the inner airfoil slots 67 in the inner flowpath shell 68 of the composite integrally bladed rotor 46. The clockwise and counter-clockwise sections 78, 80 are bent radially outwardly respectively from the middle section 76 and drawn or otherwise passed through the sock slots 83 as illustrated in FIGS. 4 and 5.

Figure 6:
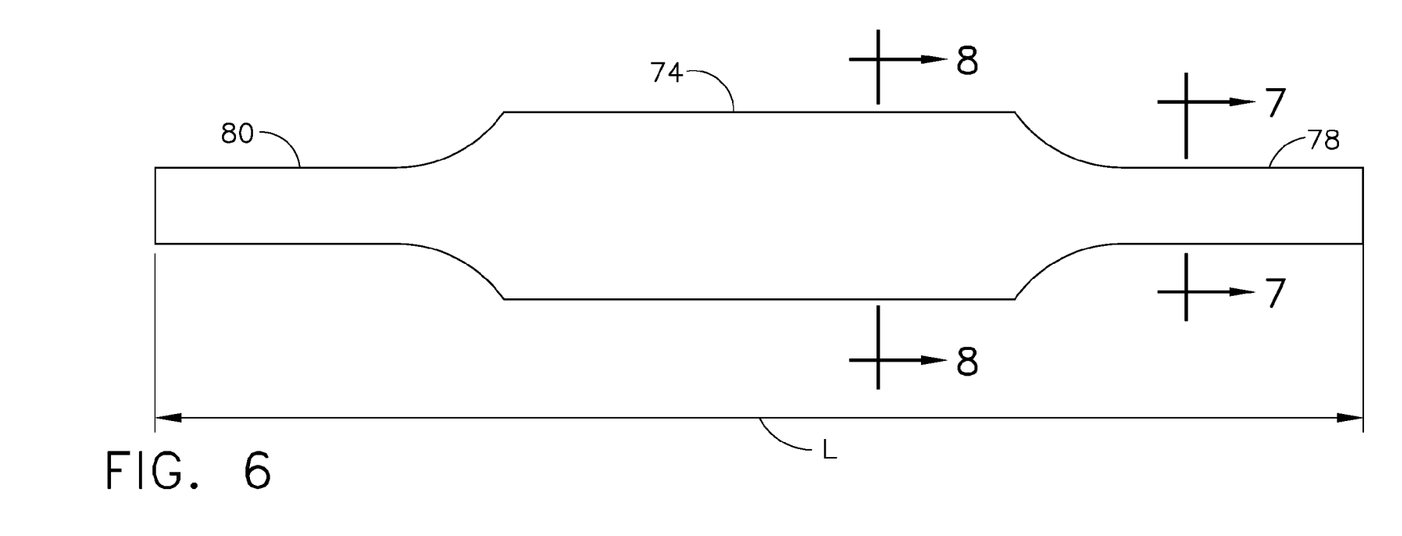
FIG. 6 is a sectional view illustration of a woven pad used in the preform illustrated in FIGS. 4 and 5.
Figure 7:
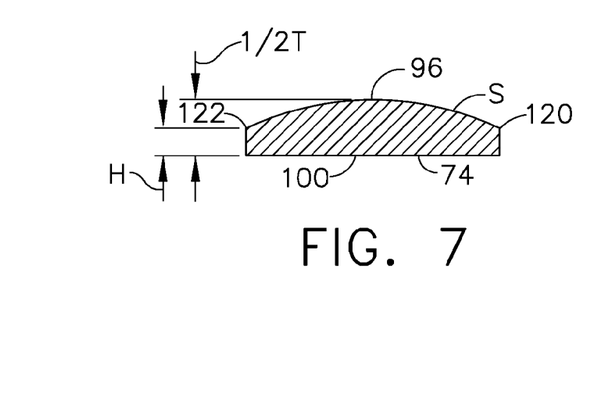
FIG. 7 is a cross-sectional view illustration of the woven pad taken through 7-7 in FIG. 6.
Figure 8:
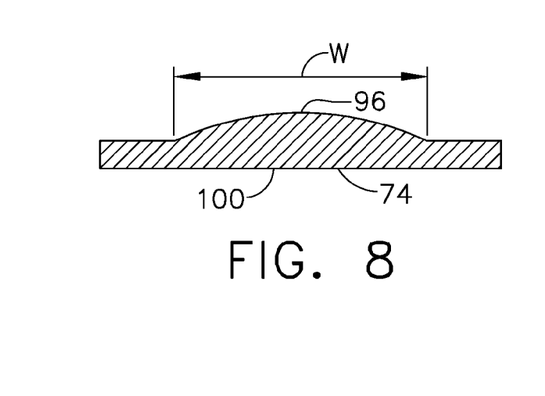
FIG. 8 is a cross-sectional view illustration of the woven pad taken through 8-8 in FIG. 6.

Referring to FIGS. 6-8, a hump 96 extends circumferentially along an entire length L of the airfoil coupon 74. The hump 96 has a constant width W and a maximum height H. The hump 96 is curved so as to provide each of the clockwise and counter-clockwise sections 78, 80 with an outer airfoil shape S. The hump 96 provides axially tapering of the clockwise and counter-clockwise sections 78, 80 via the weave such that each of the sections has an airfoil shape S with a maximum thickness T and maximum half thickness ½ T illustrated in FIGS. 2-8. The clockwise and counter-clockwise sections 78, 80 are tapered toward forward and aft edges 120, 122 corresponding to the leading and trailing edges LE, TE of the composite airfoil 48.

Undersides 100 of the airfoil coupons 74 are flat. Circumferentially adjoining clockwise and counter-clockwise sections 78, 80 of circumferentially adjoining pairs 110 of the airfoil coupons 74 are affixed to each other along the undersides 100 of the airfoil coupons 74 as illustrated in FIG. 4. In the embodiment of the composite rotor preform 70 illustrated herein, the circumferentially adjoining clockwise and counter-clockwise sections 78, 80 are sewn or stitched together to form the airfoil panels 90. This is indicated by a stitched seam 102 made with thread 104 along a meanline 108 of the composite airfoil 48 illustrated in FIGS. 2 and 3. The clockwise and counter-clockwise sections 78, 80 may be stitched together before being drawn or otherwise passed through the sock slots 83.

The various woven parts of the composite rotor preform 70 may be stitched together. The annular composite plies 49, middle sections of the airfoil coupons 74, and sock 82 may be stitched together to position these parts relative to each other and help hold them in place during resin injection and curing processes used to form the composite integrally bladed rotor 46.

Various methods may be utilized to inject resin into a woven composite preform such as the composite rotor preform 70. Injecting the preform with resin may be performed using resin transfer molding (RTM) or vacuum-assisted resin transfer molding (VARTM) while the preform is layed up on a tool system. Alternatively, a more conventional autoclaving process may be used. When the preform is placed in the mold, various mold parts or sections hold the preform in place to properly form the structure 8. Because of the various bends made during the forming of the preform there will be extraneous folds in the preform such as between the middle section 76 and the clockwise and counter-clockwise sections 78, 80 of the airfoil coupons 74. These extraneous folds are contained within the mold sections and become part of the composite structure 8.

RTM methods use RTM molds to delivers smooth surface finish on both sides of the part and can produce complex, detailed, near-net shapes at a high rate with minimal post-production trimming and/or machining. The resin is delivered under pressure with the mold pieces clamped together (or held together in a press) and, thus, parts are consistent, repeatable, dimensionally stable and well-consolidated, with relatively high fiber content and excellent void control. For high-performance parts made with higher-viscosity toughened resins, molds are usually heated and resin injection pressure is controlled with a meter/mix injection machine. Raw material costs are generally less than those for hand layup because dry preforms are used rather than traditional prepregs. Cycle time can range from two to three hours which is shorter than typical autoclave cure cycles.

Figure 10:
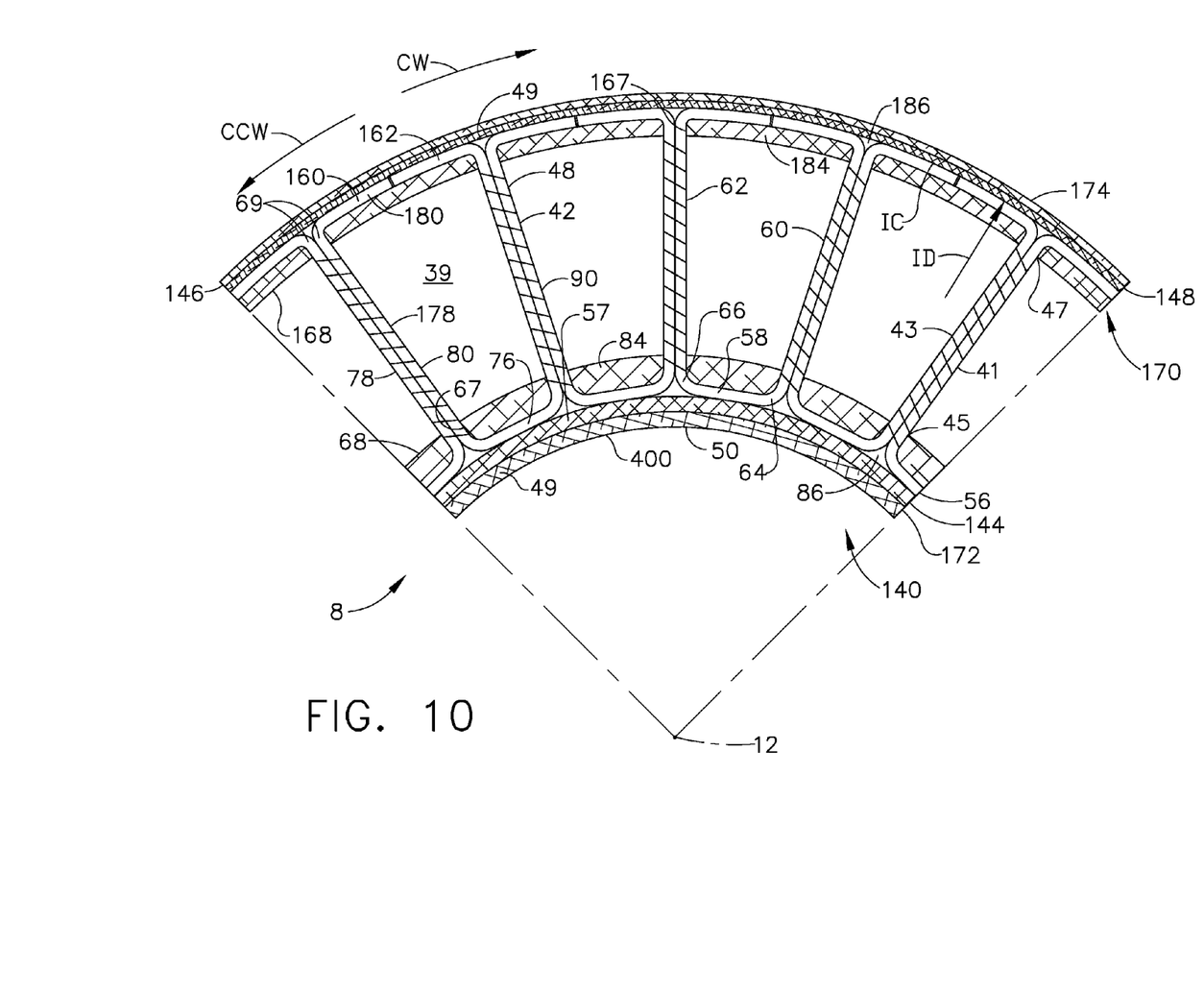
FIG. 10 is a cross-sectional view illustration of a sector for a composite integral vane assembly in the booster illustrated in FIG. 1.

Another composite gas turbine engine structure 8 illustrated herein is a composite vane stator 146. Illustrated in FIG. 10 is a sector 140 of the composite vane stator 146 which includes the annular row of composite booster vanes 42 such those in the booster 16. The composite vane stator 146 is integrally formed and includes composite airfoils 48 extending radially between an annular composite stator ring 144 and an annular composite shroud 148. Each of the composite airfoils 48 include pressure and suction sides 41, 43 extending outwardly from an airfoil base 45 at the composite stator ring 144 to an airfoil tip 47 at the annular composite shroud 148. The annular composite shroud 148 is radially spaced apart from the composite stator ring 144 and circumscribed about the centerline axis 12. The composite airfoils 48 are mounted to and are integral with the composite stator ring 144 and the annular composite shroud 148.

FIG. 10 will be used to illustrate how the composite stator ring 144 and the annular composite shroud 148 may be made the same way as the composite rotor ring 44 described above. The annular composite layers or plies 49 are made by wrapping a single continuous composite tape 50 around a mandrel or tool (not shown). The composite tape 50 is a carbon fiber woven material and is continuously wound 360 degrees as many times as there are plies 49. Thus, the composite stator ring 144 and the annular composite shroud 148 are single continuous spirals and the composite plies 49 are substantially circular or annular. The composite tape 50 is illustrated herein as being wound around twice forming 2 substantially circular or annular composite plies 49 in the composite stator ring 144 as illustrated in FIG. 10.

A circumferentially segmented airfoil ring 54 including airfoil ring segments 56 is disposed around an outermost layer or ply 57 of the composite stator ring 144. Each airfoil ring segment 56 includes an annular base 58 and radially extending clockwise and counter-clockwise airfoil segments 60, 62 at clockwise and counter-clockwise ends 64, 66 of the annular base 58. The annular base 58 is disposed about, substantially concentric with and, preferably upon, the outermost ply 57 of the composite stator ring 144. The airfoil ring 54, the annular bases 58, and the outermost ply 57 of the composite rotor ring 44 are circumscribed about the centerline axis 12 and may be conical or cylindrical.

The composite vane stator 146 further includes an inner flowpath shell 68 circumferentially disposed around the segmented airfoil ring 54 and trapping the annular bases 58 between the inner flowpath shell 68 and the outermost ply 57 of the composite stator ring 144. The clockwise and counter-clockwise airfoil segments 60, 62 extend radially outwardly through axially extending airfoil inner slots 67 in the inner flowpath shell 68. Note, that the slots are circularly angled or canted in a clockwise direction CW or a counter-clockwise direction CCW as illustrated in FIG. 5 as explained above. Each pair 69 of circumferentially adjacent clockwise and counter-clockwise airfoil segments 60, 62 form the composite airfoils 48.

The annular composite shroud 148 includes an outer flowpath shell 168 at the airfoil tips 47 and circumferentially disposed around and radially outwardly spaced apart from the outer flowpath shell 168. The inner and outer flowpath shells 68, 168 radially inwardly and outwardly respectively bound a flowpath such as the booster flowpath 39 illustrated in FIG. 1. Each airfoil ring segment 56 includes circumferentially extending clockwise and counter-clockwise shroud segments 160, 162 extending circumferentially counter-clockwise CCW and clockwise CW from the clockwise and counter-clockwise airfoil segments 60, 62 respectively at the airfoil tips 47 of the composite airfoils 48. The clockwise and counter-clockwise airfoil segments 60, 62 extend radially outwardly through axially extending outer airfoil slots 167 in the outer flowpath shell 168. The clockwise and counter-clockwise shroud segments 160, 162 extend circumferentially counter-clockwise and clockwise from the clockwise and counter-clockwise airfoil segments 60, 62 respectively along and around the outer flowpath shell 168. Note, that the slots in the outer flowpath shell 168 are circularly angled or canted in a clockwise direction CW or a counter-clockwise direction CCW.

The annular composite shroud 148 includes annular composite layers or plies 49 which are made by wrapping a single continuous composite tape 50 around the clockwise and counter-clockwise shroud segments 160, 162. The composite tape 50 is a carbon fiber woven material and is continuously wound 360 degrees as many times as there are plies 49. Thus, the annular composite shroud 148 includes a single continuous spiral and the composite plies 49 are substantially circular or annular. The composite tape 50 is illustrated herein as being wound around twice forming 2 substantially circular or annular composite plies 49 in the annular composite shroud 148 as illustrated in FIG. 10. The wound composite tape 50 and the annular composite plies 49 trap the annular clockwise and counter-clockwise shroud segments 160, 162 between the outer flowpath shell 168 and the innermost ply 157 of the annular composite shroud 148.

A composite stator preform 170 similar to rotor preform 70 disclosed above and illustrated in FIGS. 4-9 is used to form and manufacture the composite vane stator 146 illustrated in FIG. 10. The exemplary composite stator preform 170 illustrated in FIG. 10 and disclosed herein is made from a carbon fiber woven material. The stator preform 170 includes airfoil panels 90 extending radially between inner and outer ring sections 172, 174 of the stator preform 170. The airfoil panels 90 correspond to and are used to form the composite airfoils 48 extending radially between the annular composite stator ring 144 and the annular composite shroud 148 respectively.

The airfoil coupons 74 used to make the composite stator preform 170 are slightly different from those used for the rotor preform 70 described above because they have longer clockwise and counter-clockwise sections 78, 80 circumferentially extending away from the middle section 76 in the clockwise and counter-clockwise directions CW, CCW respectively. The airfoil coupons 74 include clockwise and counter-clockwise sections 78, 80. Each of the clockwise and counter-clockwise sections 78, 80 includes a panel section 178 attached to the middle section 76 and a shroud section 180 attached to the panel section 178. The shroud sections 180 are used to form the clockwise and counter-clockwise shroud segments 160, 162 extending circumferentially away from the clockwise and counter-clockwise airfoil segments 60, 62 of the annular composite shroud 148.

An inner sock 84 made from the carbon fiber woven material is used to form the inner flowpath shell 68 and an outer sock 184 is used to form the outer flowpath shell 168. The inner sock 84 is positioned over the middle sections 76 of the airfoil coupons 74. The clockwise and counter-clockwise sections 78, 80 of the airfoil coupons 74 are drawn or otherwise passed through inner sock slots 86 in the inner sock 84.

The shroud sections 180 attached to the panel sections 178 are drawn or otherwise passed through outer sock slots 186 in the outer sock 184. The shroud sections 180 of the clockwise and counter-clockwise sections 78, 80 of the airfoil coupons 74 are layed out circumferentially extending away from the panel sections 178 in the clockwise and counter-clockwise directions CW, CCW respectively around the inner circumferences IC or inner diameter ID of the outer ring section 174 of the composite stator preform 170.

The inner sock 84 traps, positions, and holds the middle sections 76 of the airfoil coupons 74 between the inner sock 84 and the inner ring section 172 of the stator preform 170. The outer sock 184 traps, positions, and holds the shroud sections 180 of the clockwise and counter-clockwise sections 78, 80 of the airfoil coupons 74 between the outer sock 184 and the outer ring section 174 of the stator preform 170. Adjoining panel sections 178 may be stitched together before being or after being drawn through the sock slots. The axially extending inner and outer sock slots 86, 186 in the socks are sized and positioned to correspond to and form the inner and outer airfoil slots 67, 167 in the inner and outer flowpath shells 68, 168 respectively of the composite vane stator 146.

The various woven parts of the composite stator preform may be stitched together. The annular composite plies 49 of the composite stator ring 144 and the annular composite shroud 148, middle sections 76 of the airfoil coupons 74, and the inner and outer socks 84, 184 may be appropriately stitched together to position these parts relative to each other and help hold them in place for resin injection and curing used to form the composite vane stator 146. The preform parts are positioned on and between various tool parts for the injection so as to properly form the composite vane stator 146 and its parts.

Figure 11:
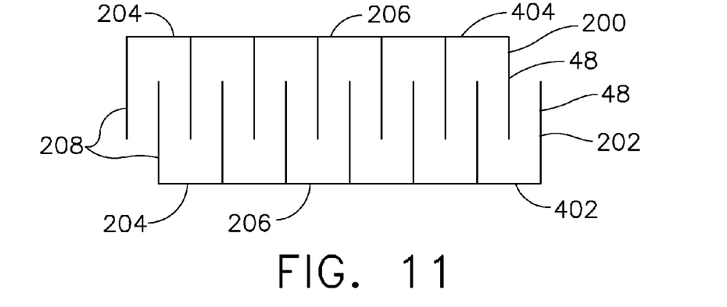
FIG. 11 is an axial cross-sectional view illustration of a gas turbine engine component with integral cantilevered airfoils.

United States Patent Application 2010/0129227, Ser. No. 12/276,522, filed Nov. 24, 2008, discloses gas turbine fan jet engines designed with counter-rotating turbines that power counter-rotating fans and boosters or low pressure compressors. Illustrated in FIG. 11 are aircraft engine components such as alternating booster stages that may incorporate composite assemblies having integral radially inwardly and outwardly extending cantilevered airfoils 200, 202 that represent both composite rotors and stators 204, 206 or composite counter-rotatable rotors 208 suitable for use in aircraft gas turbine engines such as in boosters.

For the purposes of this patent, the composite rotor ring 44 of the composite structure 8 is referred to as a hub 402 if the composite airfoils 48 extend radially outwardly from it, and a drum 404 if the composite airfoils 48 extend radially inwardly from it.

Figure 12:
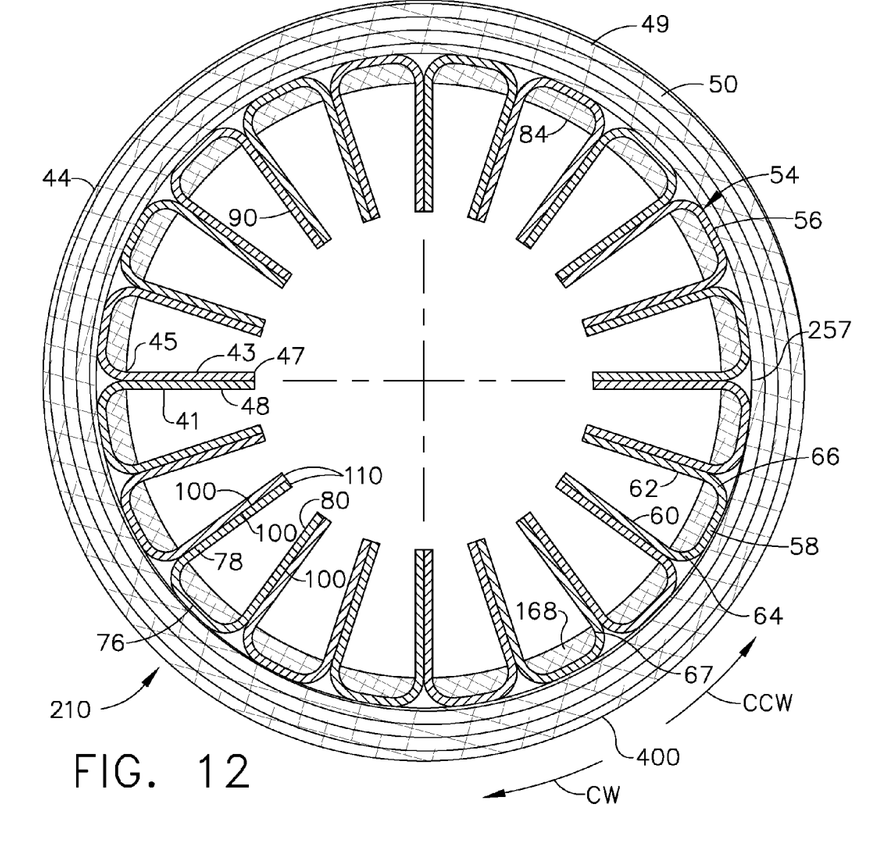
FIG. 12 is a cross-sectional view illustration of a gas turbine engine component with integral inwardly extending cantilevered airfoils.

Schematically illustrated in FIG. 12 is an exemplary embodiment of a composite gas turbine engine structure with integral cantilevered airfoils such as may be used for rotors and stators and counter-rotatable rotors. The exemplary embodiment illustrated in FIG. 12 is of a gas turbine engine booster component 210. The gas turbine engine booster component 210 includes composite airfoils 48 having pressure and suction sides 41, 43 extend inwardly and are cantilevered from an airfoil base 45 at a composite rotor ring 44 to an airfoil tip 47. The composite airfoils 48 are mounted on and are integral with the composite rotor ring 44.

The composite rotor ring 44 includes annular composite layers or plies 49 which are made by wrapping a single continuous composite tape 50 around a mandrel or tool (not shown). The composite tape 50 is a carbon fiber woven material and is continuously wound 360 degrees as many times as there are plies 49. Thus, the composite rotor ring 44 is a single continuous wrap that is slightly spiral and the composite plies 49 are substantially circular or annular. The composite tape 50 is illustrated herein as being wound around 4 times forming 4 substantially circular or annular composite plies 49.

A circumferentially segmented airfoil ring 54 including airfoil ring segments 56 is disposed around an innermost layer or ply 257 of the composite rotor ring 44. Each airfoil ring segment 56 includes an annular base 58 and radially extending clockwise and counter-clockwise airfoil segments 60, 62 at clockwise and counter-clockwise ends 64, 66 of the annular base 58. The annular base 58 is disposed about, substantially concentric with and, preferably upon, the innermost ply 257 of the composite rotor ring 44. The airfoil ring 54, the annular bases 58, and the innermost ply 257 of the composite rotor ring 44 are circumscribed about the centerline axis 12 and may be conical or cylindrical.

An outer flowpath shell 168 is circumferentially disposed around and radially outwardly of the segmented airfoil ring 54 trapping the annular bases 58 between the outer flowpath shell 168 and the innermost ply 257 of the composite rotor ring 44. The clockwise and counter-clockwise airfoil segments 60, 62 extend radially outwardly through axially extending inner airfoil slots 67 in the outer flowpath shell 168. The slots are circularly angled or canted in a clockwise direction CW or a counter-clockwise direction CCW. Each pair 69 of circumferentially adjacent clockwise and counter-clockwise airfoil segments 60, 62 form each one of the composite airfoils 48.

A composite rotor preform similar to the one illustrated in FIG. 4 is used to form and manufacture the gas turbine engine booster component 210. The annular composite plies 49 are made by wrapping the composite tape 50 around a mandrel or tool (not shown) to form a ring section, which corresponding to the composite rotor ring 44, of the preform. Airfoil coupons similar to the one illustrated in FIGS. 4-8 are made from the same carbon fiber woven material used to form the ring segments 56. Each of the airfoil coupons 74 includes a middle section 76 and clockwise and counter-clockwise sections 78, 80 circumferentially extending away from the middle section 76 in the clockwise and counter-clockwise directions CW, CCW respectively.

An inner sock 84 made from the carbon fiber woven material is used to form the outer flowpath shell 168. The sock is positioned radially inward of and over the middle sections 76 of the airfoil coupons 74. Axially extending sock slots in the sock 84 are sized and positioned to correspond to and form the airfoil slots in the outer flowpath shell 168 of the composite gas turbine engine booster component 210. The clockwise and counter-clockwise airfoil segments 60, 62 are bent radially inwardly respectively from the middle sections and through the axial slots in the sock. The axial slots in the sock correspond to and form the inner airfoil slots 67 in the outer flowpath shell 168.

A radially underside 100 of the airfoil coupon 74 is flat. Circumferentially adjoining clockwise and counter-clockwise airfoil segments 60, 62 of circumferentially adjoining pairs 110 of the airfoil coupons 74 are affixed to each other along the undersides 100 of the airfoil coupons 74 as illustrated in FIG. 12. In the embodiment of the composite rotor preform disclosed herein, these clockwise and counter-clockwise airfoil segments 60, 62 are sewn or stitched together to form the airfoil panels 90. The various woven parts of the composite rotor preform 70 may be stitched together. The annular composite plies 49, middle sections 76 of the airfoil coupons 74, and sock 84 may be stitched together to position these parts relative to each other and help hold them in place for resin injection and curing used to form the composite integrally bladed rotor 46.

After the composite gas turbine engine structure 8 has been formed using RTM or VARTM, it is in net shape or near-net shape condition. Machining and/or surface finishing may be used to produce the final component.

The assemblies disclosed herein incorporate integrally woven airfoils with a composite retention ring 400 (the composite rotor and stator rings 44, 144) at either an inner diameter ID or outer diameter OD or both to form the composite integrally bladed rotor or vane assembly. Inter-layering of the preform socks having stitched airfoil sections to form the airfoils, and the woven over sock provides circumferential spacing and stiffness of the rotor and vane assemblies. The resulting structure is an integral ring with blades or vanes making a 360 degree structure.

The assemblies and methods disclosed herein are designed to provide a composite bladed rotor or stator assembly with a robust airfoil retention system. The assemblies and methods disclosed herein allow the combination of both airfoil and retention system to be made of composite without a separate discrete retention system, which in this case is integral in the design. The assemblies and methods disclosed herein help maximize weight reduction from utilizing composite materials. They also ease manufacturing by allowing the preform to be assembled and injected with resin as a complete body.

Composite material applications to rotor structures has large advantages for weight reduction due to the reduced density of the material and inherent strength of the composite fiber. The combination of a separate composite blade and rotor is difficult due to the required attachment configuration specific to circumferential dovetails used in booster rotors. Integrating the blade and rotor into one structure eliminates the separate retention features and utilization of material strength can be maximized at minimum weight.

The blades and vanes are constructed from discrete stitched together composite airfoils coupons which allows for maximum airfoil geometric shape flexibility by tapering the coupons to meet design criteria and physical thicknesses. The airfoil coupons are stitched together, preferably at an airfoil mean line, and integrated/interlocked to the composite rotor structure by composite over wraps which can utilize composite directional properties for maximum strength and weight reduction.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A composite gas turbine engine structure comprising:
   an annular composite retention ring circumscribed about a centerline axis,
   composite airfoils mounted on and integral with and extending radially away from the retention ring,
   the retention ring including annular composite plies,
   a circumferentially segmented airfoil ring including airfoil ring segments disposed around one of an outer and inner circumferences of the retention ring,
   each of the airfoil ring segments including an annular base and radially extending clockwise and counter-clockwise airfoil segments at clockwise and counter-clockwise ends of the annular base,
   each of the composite airfoils including circumferentially adjacent ones of the clockwise and counter-clockwise airfoil segments,
   a flowpath shell circumferentially disposed around the segmented airfoil ring and trapping the annular bases between the flowpath shell and the retention ring, and
   the composite airfoils extending through slots in the flowpath shell.

2. The structure as claimed in claim 1, further comprising the annular composite plies wrapped in a single spiral.

3. The structure as claimed in claim 2, wherein the annular composite plies and the single spiral are made from a continuous composite tape.

4. The structure as claimed in claim 1, further comprising the retention ring, the composite airfoils, and the inner or outer flowpath shell made at least in part from a carbon fiber woven material.

5. The structure as claimed in claim 4, further comprising the annular composite plies wrapped in a single spiral.

6. The structure as claimed in claim 5, wherein the annular composite plies and the single spiral formed from a continuous composite tape.

7. The structure as claimed in claim 1, further comprising the circumferentially adjacent ones of the clockwise and counter-clockwise airfoil segments being stitched together.

8. The structure as claimed in claim 1, further comprising the slots being circumferentially angled or canted in a clockwise direction or a counter-clockwise direction.

9. A composite gas turbine engine structure comprising:
   an annular retention ring radially spaced apart and inwardly of an annular composite shroud,
   the retention ring and the shroud circumscribed about a centerline axis,
   composite airfoils integral with and extending radially between the retention ring and the shroud,
   the retention ring and the shroud including annular composite plies,
   a circumferentially segmented composite airfoil ring including airfoil ring segments disposed around an outer circumference of the retention ring,
   each of the airfoil ring segments including an annular base and radially extending clockwise and counter-clockwise airfoil segments at clockwise and counter-clockwise ends of the annular base,
   each of the composite airfoils including circumferentially adjacent ones of the clockwise and counter-clockwise airfoil segments,
   an inner flowpath shell circumferentially disposed around the segmented airfoil ring and trapping the annular bases between the inner flowpath shell and the retention ring, and
   the composite airfoils and the clockwise and counter-clockwise airfoil segments extending through inner slots in the inner flowpath shell.

10. The structure as claimed in claim 9, further comprising:
    the annular composite shroud including an outer flowpath shell circumferentially disposed around and radially outwardly spaced apart from the outer flowpath shell,
    the clockwise and counter-clockwise airfoil segments extending radially outwardly through axially extending outer airfoil slots in the outer flowpath shell, and
    clockwise and counter-clockwise shroud segments extending circumferentially counter-clockwise and clockwise from the clockwise and counter-clockwise airfoil segments respectively along and around the outer flowpath shell.

11. The structure as claimed in claim 10, further comprising the annular composite plies wrapped in a single spiral in each of the retention ring and the annular composite shroud.

12. The structure as claimed in claim 11, wherein the annular composite plies and the single spirals are made from continuous composite tape.

13. The structure as claimed in claim 12, further comprising the retention ring, the annular composite shroud, and the composite airfoils made at least in part from a carbon fiber woven material.

14. The structure as claimed in claim 13, further comprising the circumferentially adjacent ones of the clockwise and counter-clockwise airfoil segments being stitched together.

15. The structure as claimed in claim 13, further comprising the slots being circumferentially angled or canted in a clockwise direction or a counter-clockwise direction.

16. A method for making a gas turbine engine component composite structure, the method comprising:
    forming an integral preform having airfoil panels extend radially outwardly from and integral with a ring section,
    forming the ring section by wrapping a composite tape made of carbon fiber woven material,
    providing airfoil coupons made from the carbon fiber woven material and including a middle section and clockwise and counter-clockwise sections extending away from the middle section,
    positioning the airfoil coupons around the ring section with the middle sections on the ring section,
    positioning a sock made from the carbon fiber woven material radially outwardly of and covering the middle sections of the airfoil coupons with the clockwise and counter-clockwise sections extending through sock slots in the sock,
    positioning the clockwise and counter-clockwise sections to extend radially away from the middle sections to form the airfoil panels, and
    introducing resin into the preform and molding the preform and the resin to form the composite structure.

17. The method as claimed in claim 16 further comprising using resin transfer molding or vacuum-assisted resin transfer molding for the molding.

18. The method as claimed in claim 16 further comprising sewing or stitching together circumferentially adjoining ones of the clockwise and counter-clockwise sections before the molding.

19. The method as claimed in claim 16 further comprising providing the sock with the sock slots circumferentially angled or canted around the ring section.

20. The method as claimed in claim 19 further comprising sewing or stitching together circumferentially adjoining ones of the clockwise and counter-clockwise sections before the molding.

21. A method for making a gas turbine engine component composite structure, the method comprising:
    forming a preform integrally with airfoil panels extending radially between inner and outer ring sections,
    forming the integral stator preform with carbon fiber woven material,
    forming the inner and outer ring sections by wrapping composite tape made of the carbon fiber woven material,
    providing airfoil coupons made from the carbon fiber woven material and including a middle section and clockwise and counter-clockwise sections extending away from the middle section,
    each of the clockwise and counter-clockwise sections including a panel section attached to the middle section and a shroud section attached to the panel section,
    positioning the airfoil coupons around the inner ring sections,
    providing inner and outer socks made from the carbon fiber woven material,
    positioning the inner sock radially outwardly of and covering the middle sections of the airfoil coupons with the clockwise and counter-clockwise sections extending through inner sock slots in the inner sock,
    positioning the clockwise and counter-clockwise sections to extend radially away from the middle sections to form the airfoil panels,
    drawing or passing the shroud sections through outer sock slots in the outer sock,
    positioning the shroud sections of the clockwise and counter-clockwise sections extending circumferentially away from the panel sections in the clockwise and counter-clockwise directions respectively around an inner circumferences or inner diameter of the outer ring section, and
    introducing resin into the preform and molding the preform and the resin to form the composite structure.

22. The method as claimed in claim 21 further comprising trapping the middle sections of the airfoil coupons between the inner sock and the inner ring section and trapping the shroud sections of the clockwise and counter-clockwise sections of the airfoil coupons between the outer sock and the outer ring section of the stator preform.

23. The method as claimed in claim 22 further comprising using resin transfer molding or vacuum-assisted resin transfer molding for the molding.

24. The method as claimed in claim 22 further comprising sewing or stitching together circumferentially adjoining ones of the panel sections of the clockwise and counter-clockwise sections before the molding.

25. The method as claimed in claim 24 further comprising providing the inner and outer socks with the inner and outer sock slots circumferentially angled or canted around the inner and outer ring sections.

* * * * *